(12) United States Patent
LaBruno

(10) Patent No.: US 6,416,314 B1
(45) Date of Patent: Jul. 9, 2002

(54) PATTY-FORMING MOLD PLATE ASSEMBLY

(75) Inventor: Ronald F. LaBruno, Mt. Prospect, IL (US)

(73) Assignee: Formax, Inc., Mokena, IL (US)

(*) Notice: Subject to any disclaimer, the term of this patent is extended or adjusted under 35 U.S.C. 154(b) by 0 days.

(21) Appl. No.: 09/545,804

(22) Filed: Apr. 8, 2000

(51) Int. Cl.[7] .......................... A22C 7/00; B29C 45/34
(52) U.S. Cl. ..................... 425/546; 425/556; 425/575; 425/812; 426/513
(58) Field of Search .............................. 425/556, 562, 425/572, 574, 576, 812, 546, 575; 426/513

(56) References Cited

U.S. PATENT DOCUMENTS

| | | | |
|---|---|---|---|
| 3,731,345 A | * | 5/1973 | Brackman |
| 3,939,530 A | * | 2/1976 | Holly .......................... 425/574 |
| 3,952,478 A | | 4/1976 | Richards et al. |
| 4,054,967 A | | 10/1977 | Sandberg et al. |
| 4,118,831 A | * | 10/1978 | Holly et al. |
| 4,182,003 A | | 1/1980 | Lamartino et al. |
| 4,233,710 A | | 11/1980 | Wagner |
| 4,317,259 A | * | 3/1982 | Wagner |
| 4,329,828 A | | 5/1982 | Wagner |
| 4,338,702 A | | 7/1982 | Holly |
| 4,356,595 A | | 11/1982 | Sandberg et al. |
| 4,372,008 A | | 2/1983 | Sandberg |
| 4,418,446 A | | 12/1983 | Sandberg et al. |
| 4,541,143 A | | 9/1985 | Holly |
| 4,608,731 A | | 9/1986 | Holly |
| 4,697,308 A | | 10/1987 | Sandberg |
| 4,821,376 A | | 4/1989 | Sandberg |
| 4,872,241 A | * | 10/1989 | Lindee .......................... 426/513 |
| 5,022,888 A | * | 6/1991 | Lindee .......................... 425/556 |

FOREIGN PATENT DOCUMENTS

WO    WO 99/62344 A1    12/1999

* cited by examiner

*Primary Examiner*—Robert Davis
(74) *Attorney, Agent, or Firm*—Polit & Associates, LLC

(57) ABSTRACT

A mold plate assembly for a patty forming apparatus includes a mold plate having patty forming cavities and a breather plate arranged facing the mold plate. A fill slot is arranged facing the mold cavities, on a side opposite the breather plate, to fill food product into said mold cavity when the mold plate is in a filling position. The breather plate includes first breather holes at a remote position from the inlet slot to discharge air to ensure an even and uniform filling of the food product into the cavity, and second breather holes located close to the fill slot to relieve filling pressure at that location to avoid the formation of a ridge on the finished formed food patty.

12 Claims, 4 Drawing Sheets

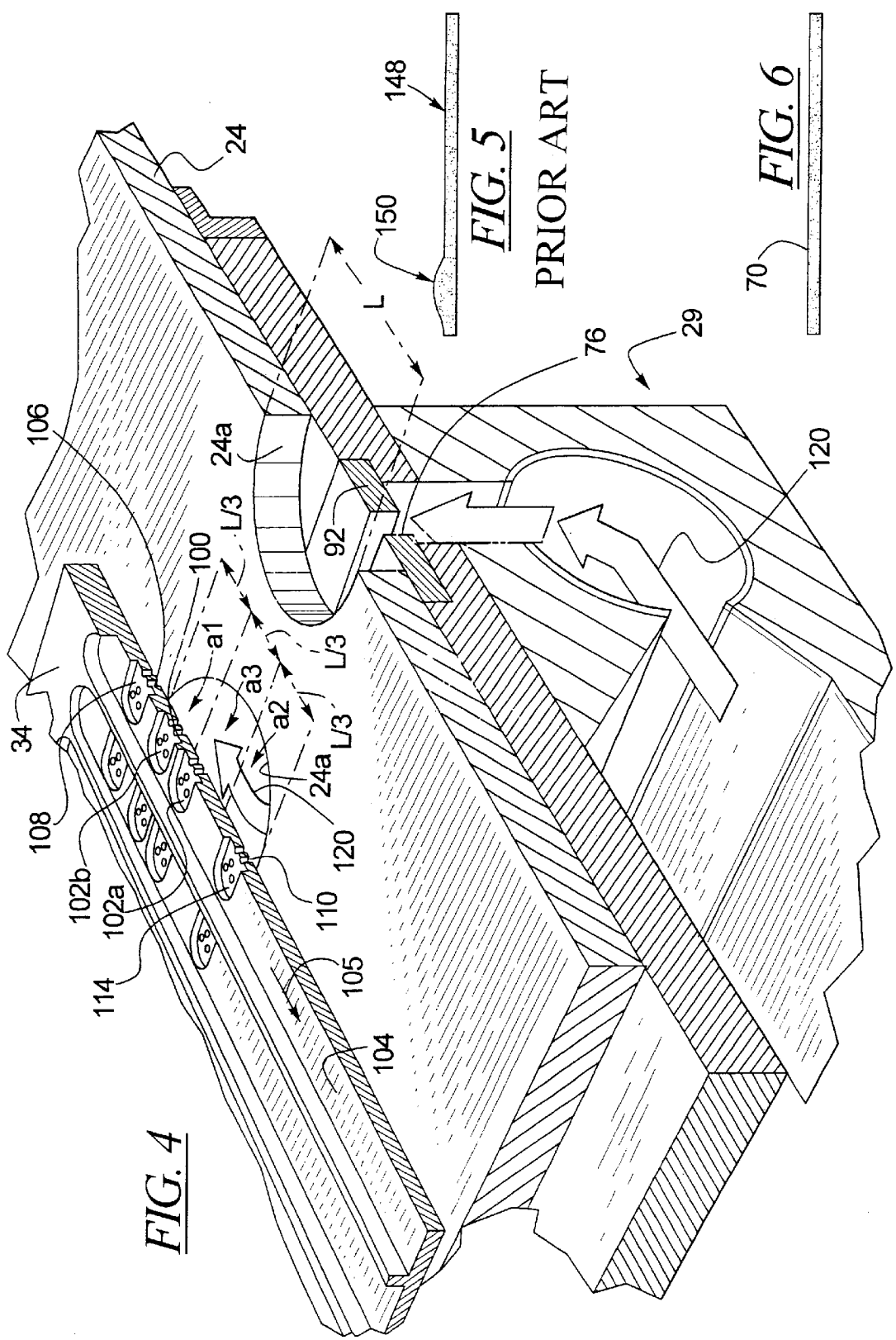

PATTY-FORMING MOLD PLATE ASSEMBLY

TECHNICAL FIELD OF THE INVENTION

The present invention relates to food patty forming machines. The invention particularly relates to an improved mold plate for a food patty forming machine.

BACKGROUND OF THE INVENTION

Food patty forming machines are described for example in U.S. Pat. Nos. 3,952,478; 4,054,967; 4,182,003; 4,608,731; 4,541,143 and 4,329,828, and PCT published application WO 99/62344.

In one type of food patty forming machine a mold plate, having patty shaped cavities, is reciprocated between a fill position and a knock out position. In the fill position, food product is delivered into cavities. The cavities are located above or below a food product delivery apparatus. Within the food product delivery apparatus, the food product, such as ground beef or ground poultry, is pumped by a plunger through a manifold and then upwardly or downwardly through a fill slot and into the mold cavities, forming patties.

A breather plate is arranged above or below the mold plate on a side opposite the delivery apparatus. The breather plate includes breather holes which communicate or express air out of the mold cavities while food product is being filled into the cavities from above or below. The breather holes are located at a position. above or below the cavities that is distant from the position of the fill slot, so that a uniform patty shape can be achieved as the air within the mold cavities and within the food product is expelled through the breather holes. During filling, the food product delivered through the fill slot impacts against a solid wall portion of the breather plate directly opposite the fill slot, as the food product advances forward toward the breather holes. After filling of the cavities, the mold plate is then shifted to the knock out position where the mold cavities are remote from the breather plate and the fill slot. The patties are then knocked out of the cavities by a knockout mechanism.

The present inventor has recognized that food patties formed by the aforementioned food patty forming machine have a tendency to form a compressed area of food product above or below the fill slot due to the pressure of the food product filling the mold cavity. The compressed area forms a ridge on the finished patty. This ridge constitutes a region of more dense food product which leads to nonuniform cooking of the patty. FIG. 5 illustrates such a patty 148 having the ridge 150.

The present inventor has recognized that it would be advantageous to provide a food patty forming machine which overcame the above mentioned draw back and produced a food patty having a uniform food density and thickness.

SUMMARY OF THE INVENTION

The invention contemplates an improved food patty forming machine of the type having a reciprocating mold plate having at least one cavity which is filled with food product from a fill slot open to one side of the cavity. The improvement comprises the use of first breather holes remote from the fill slot and second breather holes located close to the fill slot.

According to the invention, locating second breather holes close to the fill slot, particularly at the fill slot, or trailing the fill slot ("trailing" or "leading" referring to the direction of movement of the mold plate from the filling position to the knock out position) is particularly effective when used in addition to the location of the first breather holes leading the fill slot, and act to make uniform the density of the food product within the mold cavity.

As food product is filled into the mold cavities, air is forced through both the first breather holes and the second breather holes. However, since the first breather holes have an aggregate open area greater than-the second breather holes, a uniform filling of the cavity, and a uniform food patty is achieved. The second breather holes are sized sufficiently to relieve pressure within the cavity during filling to eliminate the ridge otherwise present on the finished patty.

The breather plate includes return channels on a side thereof opposite the mold plate. Any food product particles which pass through the first and second breather holes are collected and returned through the return channels to a food product collection area to be recycled within the food patty forming machine.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a fragmentary schematical perspective view, shown partly in section, of the mold plate and breather plate of the machine of FIG. 1;

FIG. 5 is a sectional view of a typical food patty formed by a prior art patty forming machine; and FIG. 6 is a sectional view of a patty formed by a the patty forming machine of the present invention.

DETAILED DESCRIPTION OF THE PREFERRED EMBODIMENTS

Figure 1:
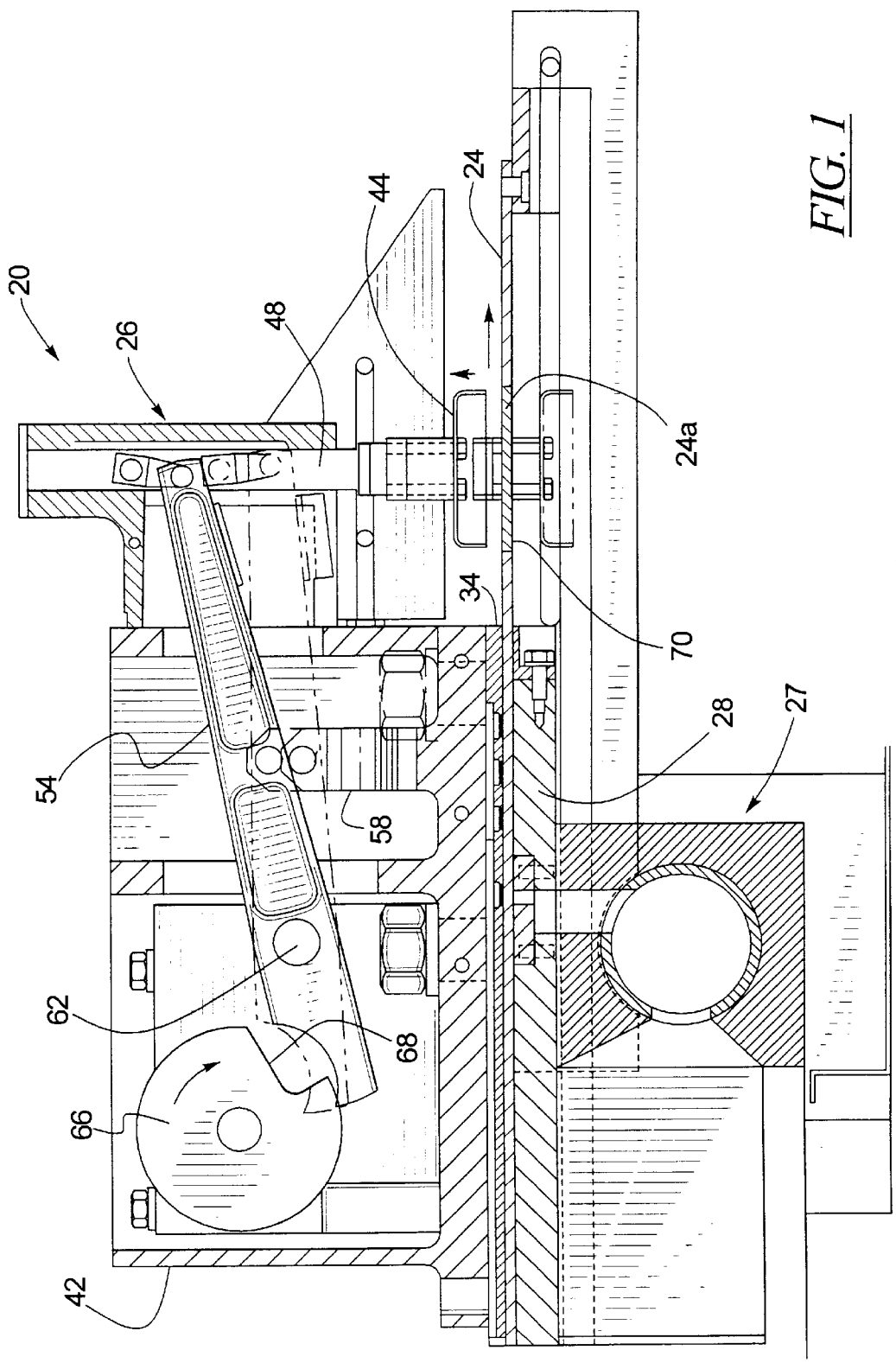
FIG. 1 is a sectional view of the food patty molding machine of the invention with a mold plate in a knock out position.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a food patty forming machine 20 of a type such as described in U.S. Pat. Nos. 4,329,828; 3,952,478; 4,054,967; 4,182,003; 4,608,731; 4,541,143; and PCT published application WO 99/62344, all herein incorporated by reference. The machine 20 includes a mold plate 24 driven to reciprocate in a horizontal plane by drive means (not shown). The mold plate is located between a patty knock out apparatus 26 and a food product filling apparatus 27. The mold plate 24 is illustrated in FIG. 1 in a knock out position.

The mold plate 24 is carried by a machine top plate 28 and guided on a top side thereof by a breather plate 34. Although the breather plate 34 is located above the mold plate 24 and the filling apparatus 27 is below the mold plate 24, these relative positions could be reversed and such an arrangement is also encompassed by the invention.

The knock out apparatus 26, including a frame 42, is mounted above the breather plate 34. The knock out apparatus 26 includes a knock out pusher 44 which is driven to reciprocate in a vertical direction. The pusher 44 is carried by a knock out rod 48 which is pinned to a knock out lever 54. The lever 54 is pinned to a spring assembly 58. The lever 54 is pivoted at a rotary joint 62 to the frame 42. The spring assembly 58 urges the lever 54 to pivot in a clockwise direction. A cam 66 having a cut-out 68 is driven in rotation by rotation means, (not shown). The moving position of the cut-out 68 causes the lever 54 to rock, which causes the knock out pusher 44 to reciprocate vertically. The pusher 44 is adapted to register with a mold cavity 24a in the mold plate 24. A food patty 70, formed in the mold cavity 24a, as described below, is thereby pushed from the cavity to be deposited below the mold plate and/or conveyed to a remote location.

Advantageously, the mold plate 24 includes a plurality of cavities 24a (such as four), and a plurality of pushers 44 are reciprocated together to knock out a plurality of patties 70 from the cavities. For simplicity of description only a single cavity 24a is described below.

Figure 2:
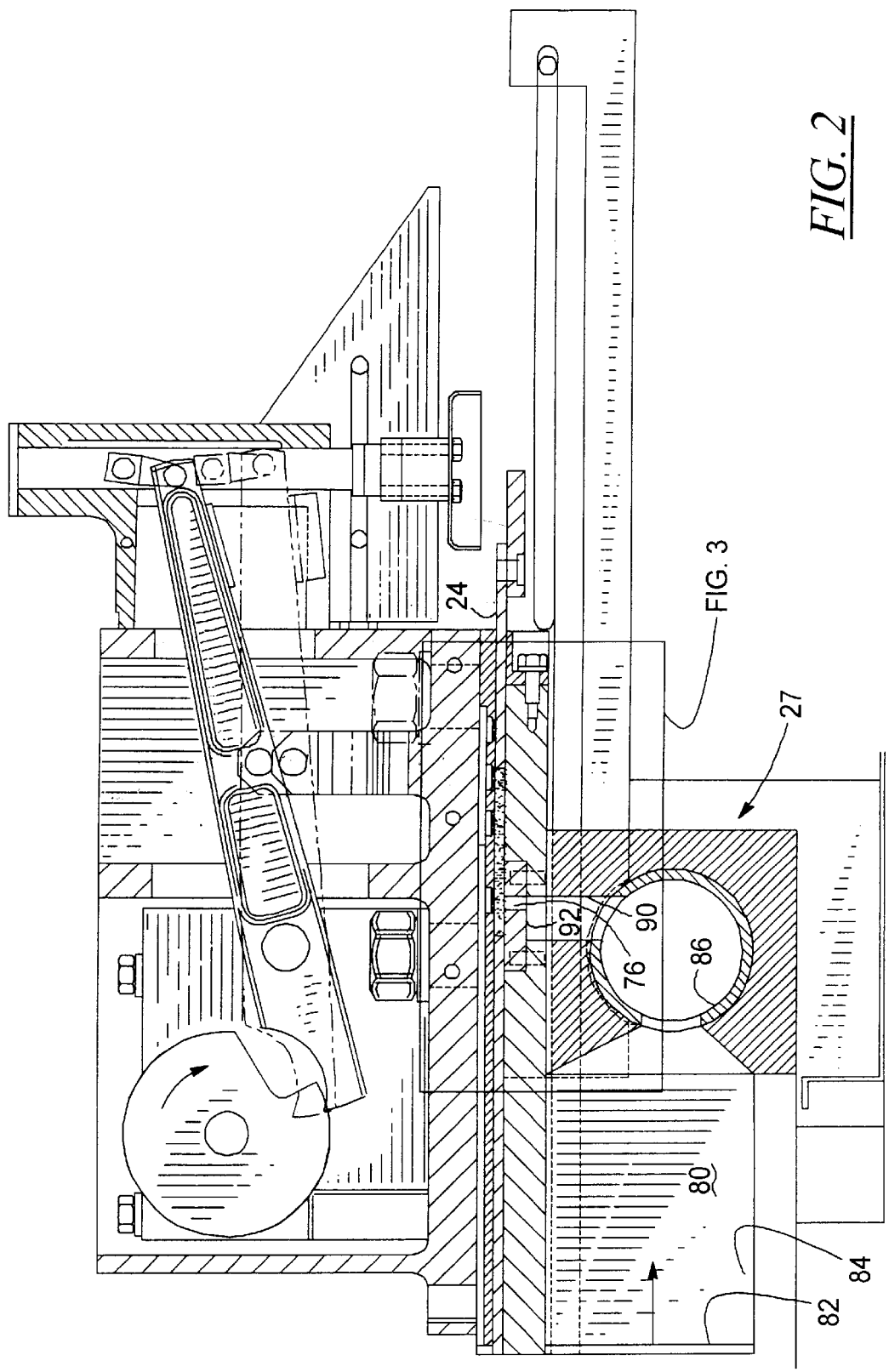
FIG. 2 is a sectional view of the food patty molding machine of FIG. 1 with the mold plate in a filling position.

FIG. 2 illustrates the machine 20 of FIG. 1 with the mold plate 24 retracted (to the left) to a cavity filling position. In this position, the cavity 24a is located above a cavity fill slot 76 of the food product filling apparatus 27. Food product 80 is pumped by a plunger 82, through a cylinder 84, and into a tube valve 86. The tube valve 86 is used to switch between the cylinder 84 and an alternate cylinder (not shown) for switching food product supply. Food product 80 passes from the tube valve 86 into a delivery slot 90. The delivery slot is partly closed by a fill slot insert plate 92 which defines the fill slot 76.

Figure 3:
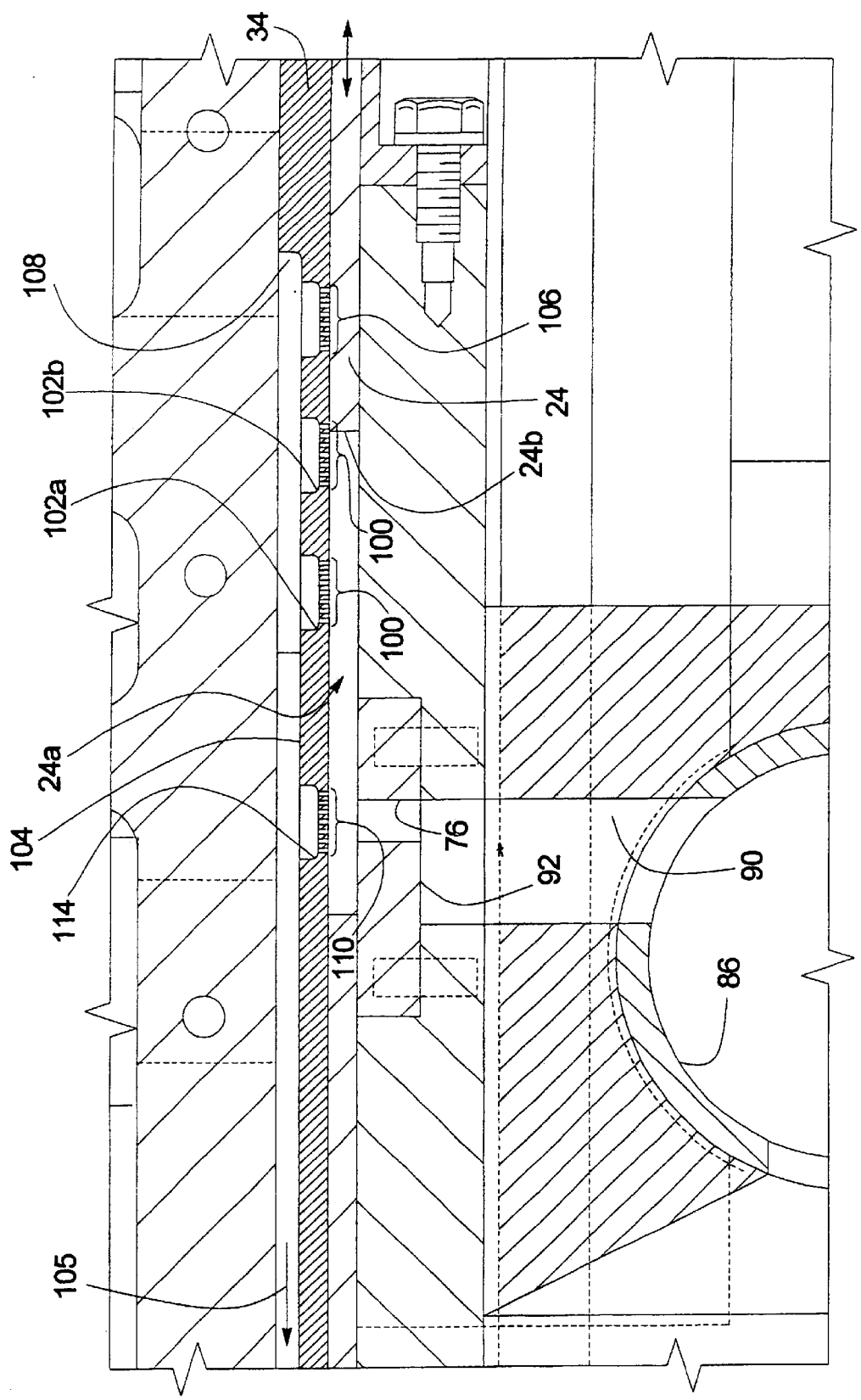
FIG. 3 is an enlarged fragmentary sectional view from FIG. 1.

FIG. 3 illustrates that the breather plate 34 includes a plurality of first breather holes 100 located within two recesses 102a, 102b. The breather holes 100 have a diameter of between about 0.040" to about 0.065". The recesses 102a, 102b allow for easier and more complete cleaning of food particles from the breather holes 100 due to a reduced depth and lowered aspect ratio of the breather holes 100. The recesses 102a, 102b are open on top to an air channel or recycle channel 104 which is configured to transport air and small food particles in the direction 105 back to the food product hopper (not shown) or other suitable location. The breather holes 100 are open between the recesses 102a, 102b and the cavity 24a.

A further group of breather holes 106 are located within a recess 108. The recess 108 is located at a position beyond a leading edge 24b of the cavity 24a when in the filling position. During operation, the breather holes 106 are open the cavity 24a to the recess 108 after the mold plate 24 has begun return travel from the knock out position toward the filling position, but before the mold plate has completely reached the filling position. Filling of the cavity 24a and air breathing through the holes 106 begins when the fill slot is first uncovered by the moving cavity 24a, returning from the knock out position. The recess 108 is also open to the recycle channel 104.

The breather plate 34 also includes a plurality of second breather holes 110 located within a recess 114. The recess 114 is located close to the fill slot 76, such as being in direct opposition to the fill slot. The recess 114 is also open into the channel 104. The holes 110 have a diameter of between about 0.040" to about 0.065".

The recesses 108 and 114 allow for easier and more complete cleaning of the respective holes 106, 110 due to their reduced depth and lowered aspect ratio.

FIG. 4 illustrates schematically the arrangement of the breather plate 34, the mold plate 24, and the food product filling apparatus 27. Food product 120 is delivered under pressure through the fill slot 76 of the insert plate 92 and into a plurality of cavities 24a. The first holes 100 are advantageously located within a first area $a1$ of the cavity 24a that is within one third of the cavity length L, the area $a1$ extending rearwardly from a leading edge of the cavity 24a. The second holes 110 are advantageously located within a second area $a2$ of the cavity 24a that is within one third of the cavity length L, the area $a2$ extending forwardly from a trailing edge of the cavity 24a.

A central area $a3$ of the cavity is advantageously one third the cavity length L and is substantially free of breather holes. The central area is advantageously not less than one inch in length.

The second holes 110 preferably do not number less than four holes per cavity and do not constitute an aggregate open area more than 50% of the aggregate open area of the front holes 100.

According to one exemplary embodiment patty-forming machine having 3.875 inch diameter cavities, for each cavity 24a there are thirty five 0.040 inch diameter further breathing holes 106 within the recess 108, seventy 0.040 inch diameter first breather holes 100 within the recesses 102a, 102b (aggregate number), and nine 0.040 diameter second breather holes 110 within the recess 114.

According to the preferred embodiments, the recesses 102a, 102b, 108, 114 can be circular, oval, rounded rectangular or other shape, in plan view.

The second holes 110 can advantageously be located directly facing the fill slot and/or slightly behind (¼ to ½ inch) the fill slot. The relief of pressure directly at and toward the rear of the fill slot as the mold cavity is moving toward and past the fill slot opening eliminates or significantly reduces the presence of a ridge on the formed food patty. The forward location of the first holes 100 and the further breather holes 106 ensure even and uniform filling of the entire cavity 24a with food product.

FIG. 5 illustrates a patty 148 formed by a prior art molding plate lacking second holes as per the present invention. A ridge 150 is typically formed above the inlet slot. In contrast, as shown in FIG. 6, the patty 70 formed by a patty forming machine of the present invention is substantially flat and evenly shaped.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An improved patty forming apparatus, comprising
   a mold plate having a mold cavity through a thickness thereof said mold plate being free of mold obstructions along a length of said cavity;
   a food product delivery channel arranged on one side of the mold plate and having a fill opening into said cavity;
   a breather plate overlying said mold plate, said breather plate having a plurality of first breather holes therethrough located remote from said fill opening, a plurality of second breather holes located close to said fill opening, spaced from said plurality of first breather holes, a region of said breather plate between said first and second pluralities extending about one third the length of the cavity or greater, said region being substantially free of breather holes, said first and second breather holes for expressing air during the filling of the cavity with food product.

2. The apparatus according to claim 1, wherein said first breather holes are located within a first area adjacent a leading edge of the cavity that is farthest from the fill opening, the first area extending one third of the length of the cavity, and said second breather holes are located within a second area adjacent an opposite edge of the cavity that extends one third the length of the cavity.

3. The apparatus according to claim 1, wherein said mold plate is arranged to reciprocate with respect to said delivery channel and said breather plate.

4. The apparatus according to claim 2, wherein said second breather holes have an aggregated open area not more than 50% of an aggregate area of said first holes.

5. The apparatus according to claim 1, wherein said plurality of second breather holes is located directly facing said opening.

6. A food patty molding apparatus, comprising:
   a machine frame;
   a mold plate having at least one cavity and mounted to reciprocate with respect to said frame to position the cavity between a filling position and a mold patty knock out position, said cavity being free of mold obstructions along a length of said cavity;
   a food product delivery channel mounted stationary with respect to said frame and having an opening into said cavity when said mold plate is in said filling position;
   a breather plate facing said mold plate and stationary with respect to said frame, said breather plate having a plurality of first breather holes therethrough located remote from said fill opening, and a plurality of second breather holes located close to said fill opening, spaced from said plurality of first breather holes, a region of said breather plate between said first and second pluralities extending at least about one third the length of the cavity being substantially free of breather holes, said first and second breather holes for expressing air during the filling of the cavity with food product.

7. The apparatus according to claim 6, wherein said first breather holes are located within a first area adjacent a leading edge of the cavity that is farthest from the fill opening, the first area extending one third of the length of the cavity, and said second breather holes are located within a second area adjacent an opposite edge of the cavity that extends one third the length of the cavity.

8. The apparatus according to claim 7, wherein said second breather holes have an aggregated open area not more than 50% of an aggregate area of said first holes.

9. The apparatus according to claim 6, wherein said breather plate includes an air channel formed on a side thereof opposite said mold plate, and said first and second breather holes are open between said cavity and said air channel.

10. The apparatus according to claim 6, wherein said plurality of second breather holes is located directly facing said opening.

11. An improved patty forming apparatus, comprising:
   a mold plate having a mold cavity through a thickness thereof;
   a food product delivery channel arranged on one side of the mold plate and having a fill opening into said cavity;
   a breather plate overlying said mold plate, said breather plate having a plurality of first breather holes therethrough located remote from said fill opening, a plurality of second breather holes located close to said fill opening, spaced from said plurality of first breather holes, said first and second breather holes for expressing air during the filling of the cavity with food product;
   wherein said plurality of first breather holes is located within a first area adjacent a leading edge of the cavity that is farthest from the fill opening, the first area extending one third of the length of the cavity, and said plurality of second breather holes is located within a second area adjacent an opposite edge of the cavity that extends one third the length of the cavity, and an area extending between said first and second areas being substantially free of breather holes; and
   said second breather holes having an aggregated open area not more than 50% of an aggregate area of said first holes.

12. A food patty molding apparatus, comprising:
   a machine frame;
   a mold plate having at least one cavity and mounted to reciprocate with respect to said frame to position the cavity between a filling position and a mold patty knock out position;
   a food product delivery channel mounted stationary with respect to said frame and having an opening into said cavity when said mold plate is in said filling position;
   a breather plate facing said mold plate and stationary with respect to said frame, said breather plate having a plurality of first breather holes therethrough located remote from said fill opening, and a plurality of second breather holes located close to said fill opening, spaced from said plurality of first breather holes, said first and second breather holes for expressing air during the filling of the cavity with food product;
   said plurality of first breather holes is located within a first area adjacent a leading edge of the cavity that is farthest from the fill opening, the first area extending one third of the length of the cavity, and said plurality of second breather holes is located within a second area adjacent an opposite edge of the cavity that extends one third the length of the cavity; and
   said second breather holes having an aggregated open area not more than 50% of an aggregate area of said first breather holes.

* * * * *